M. M. BARRY.
Safety-Devices for Car-Trucks.
No. 150,512.                                 Patented May 5, 1874.
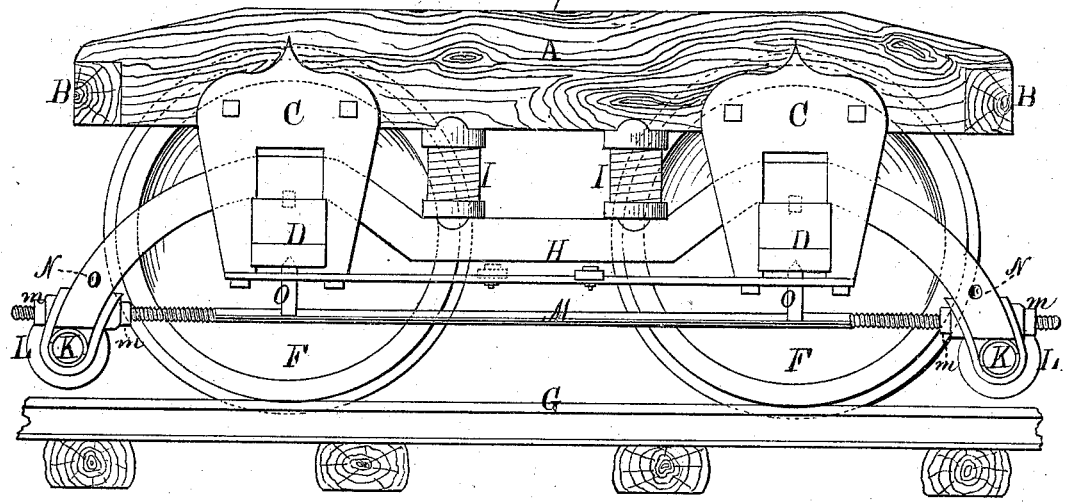
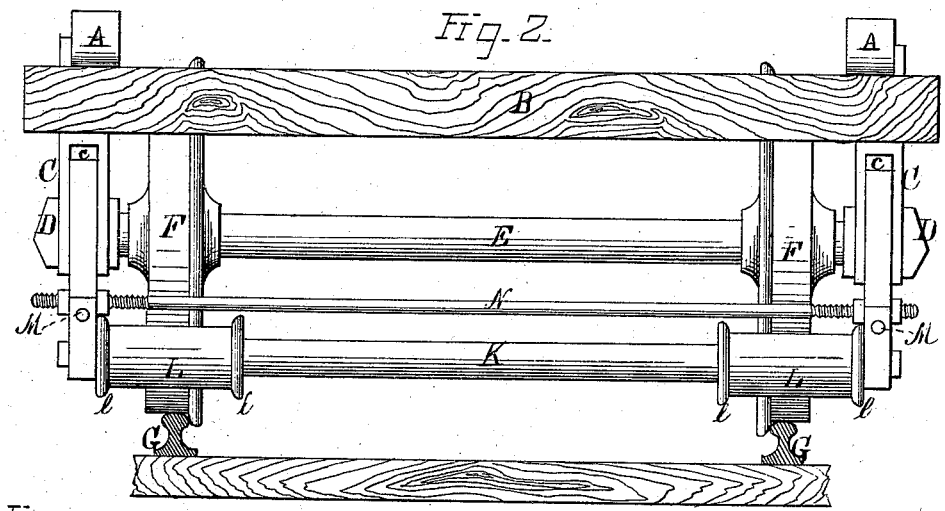

UNITED STATES PATENT OFFICE.

MEDDY M. BARRY, OF ROME, GEORGIA.

IMPROVEMENT IN SAFETY DEVICES FOR CAR-TRUCKS.

Specification forming part of Letters Patent No. 150,512, dated May 5, 1874; application filed February 27, 1874.

*To all whom it may concern:*

Be it known that I, MEDDY M. BARRY, of Rome, in the county of Floyd and in the State of Georgia, have invented certain new and useful Improvements in Safety Attachments for Car-Trucks; and do hereby declare that the following is a full, clear, and exact description thereof, reference being had to the accompanying drawing, making a part of this specification, in which—

Figure 1 is a side elevation of a car-truck provided with my improved safety attachment, and Fig. 2 is an end elevation of the same.

Letters of like name and kind refer to like parts in each of the figures.

The design of my invention is to prevent a car from jumping the track when the wheels of its trucks leave the rails; to which end it consists, principally, in the peculiar construction of the trussed equalizer-bars, substantially as and for the purpose hereinafter specified. It consists, further, in the combination of the trussed equalizer-bars with the guard-rollers and their axles, substantially as and for the purpose hereinafter shown. It consists, finally, in the means employed for locking in relative vertical positions the equalizer-bars and journal-boxes, substantially as and for the purpose hereinafter set forth.

In the annexed drawing, A and A represent the side rails of a car-truck connected together at their ends by means of two cross-rails, B and B, and each provided with two pedestals, C and C, of usual construction. Within each pedestal C is fitted a journal-box, D, that receives one end of an axle, E, the opposite end of which is in a like manner contained within the corresponding opposite journal-box D, while upon said axle, immediately within said boxes, are placed two car-wheels, F and F, the peripheries of which rest upon the usual rails G and G. Each pedestal C is provided with a vertical central slot, c, that has a line with the draft, and receives one end of an equalizer-bar, H, that has the shape shown in Fig. 1, its central portion, between said pedestals, being straight and horizontal from thence outward in either direction, formed upon an arch, the crown of which rests upon the upper side of a journal-box. Between said horizontal central portion and the side rail A are placed two springs, I, through which and through said equalizer-bar the weight of the car and its load is transmitted to the journal-boxes. The ends of each equalizer-bar H extend in a curve downward to a point near the upper surface of the rail G, and within the same and the corresponding end of the opposite bar H is journaled an axle, K, which axle, immediately within its bearings, is provided with two small wheels, L and L, that have each a breadth of tread equal to about twice that of an ordinary car-wheel, and, at each of their ends, are provided with a guard-flange, $l$, as shown. At points immediately above the journals of the axles K and K a truss-rod, M, extends horizontally through each equalizer-bar H, and, by means of nuts $m$ and $m$, placed upon its threaded ends at each side of said bar, enables the latter to be rendered as rigid longitudinally as may be required. Suitable cross-rods N, extending between the corresponding ends of the trussed equalizer-bars, insure their transverse positions, and enable them to resist any lateral strain. A stud or standard, O, extending vertically between each journal-box D and the truss-rod M, completes the truck; the operation and advantages of which are as follows:

The peculiar construction of the equalizer-bars gives to them great strength with comparatively small weight, while, from their form, said bars do not interfere in any manner with the operation of other portions of the truck. The standards placed between the truss-rods and the lower sides of the journal-boxes confine the latter and the equalizer-bars closely together, and prevent all injurious vertical play between said parts. Finally, the guard rollers or wheels placed at each end of the equalizer-bars furnish broad and safe bearings for the truck in the event of the ordinary wheels leaving the rails, and will effectually prevent a car from leaving the track while its rails are intact.

I am aware that guard-wheels attached to or upon the ends of equalizer-bars, have before been used, and therefore do not claim, broadly, such construction.

Having thus fully set forth the nature and merits of my invention, what I claim as new is—

1. The equalizer-bar H, combined with the truss-rod M and nuts $m$ and $m$, substantially as and for the purpose specified.

2. In combination with the trussed equalizer-bars H, M, $m$, and $m$, the axles K and K and guard-wheels L and L, substantially as and for the purpose shown.

3. In combination with the journal-boxes D and D, and with the trussed equalizer-bars H, M, $m$, and $m$, the standards O and O, extending between said boxes and the rods M, substantially as and for the purpose set forth.

In testimony that I claim the foregoing I have hereunto set my hand this 18th day of February, 1874.

MEDDY M. BARRY.

Witnesses:
 JULIUS R. HOWELL,
 W. B. MCLANE.